(12) United States Patent
Lee

(10) Patent No.: US 7,136,671 B2
(45) Date of Patent: Nov. 14, 2006

(54) SPEAKER MODULE CONNECTABLE TO AN EARPHONE JACK OF MOBILE PHONE AND METHOD FOR USING SAME

(75) Inventor: Dong-Il Lee, Seoul (KR)

(73) Assignee: SK Teletech Co. Ltd., Seoul (KR)

( * ) Notice: Subject to any disclaimer, the term of this patent is extended or adjusted under 35 U.S.C. 154(b) by 529 days.

(21) Appl. No.: 10/253,256

(22) Filed: Sep. 24, 2002

(65) Prior Publication Data
US 2003/0078073 A1 Apr. 24, 2003

(30) Foreign Application Priority Data
Sep. 25, 2001 (KR) .............................. 2001-59247

(51) Int. Cl.
*H04M 1/00* (2006.01)

(52) U.S. Cl. ................ 455/556.1; 455/557; 455/569.1; 455/572; 455/573; 381/300; 381/302; 381/91

(58) Field of Classification Search ............. 455/556.1, 455/557, 569.1, 572, 573; 381/300, 302, 381/91
See application file for complete search history.

(56) References Cited

U.S. PATENT DOCUMENTS

| 5,659,887 | A | * | 8/1997 | Ooe | 455/575.9 |
| 6,058,184 | A | * | 5/2000 | Frank | 379/420.02 |
| 6,108,567 | A | * | 8/2000 | Hosonuma | 455/569.2 |
| 6,397,087 | B1 | * | 5/2002 | Kim et al. | 455/569.1 |

* cited by examiner

*Primary Examiner*—Matthew Anderson
*Assistant Examiner*—Minh Dao
(74) *Attorney, Agent, or Firm*—Morgan & Finnegan LLP

(57) ABSTRACT

The present invention provides a speaker module connectable to an earphone jack of a mobile phone and a method for using same. The speaker module comprises a microphone which converts voice signals into electrical signals, a speaker which converts electrical signals into acoustic signals, an amplifier which amplifies electrical signals, and a plug for connecting with the earphone jack of the mobile phone. Further, the plug can additionally comprise a terminal for sensing whether or not the speaker module is connected to the earphone jack terminal of the mobile phone.

4 Claims, 3 Drawing Sheets

SPEAKER MODULE CONNECTABLE TO AN EARPHONE JACK OF MOBILE PHONE AND METHOD FOR USING SAME

FIELD OF THE INVENTION

The present invention relates to a speaker module that is connectable to an earphone jack of mobile phone and a method for using same.

DESCRIPTION OF THE PRIOR ART

With the widespread use of mobile phones, there exists an increasing demand for communication via mobile phones regardless of time or location, e.g. even when they are walking or driving a car. However, since most mobile phones require to be held by one hand while in use, it is inconvenient for a user to use a mobile phone when he is driving a car or carrying a package.

In order to solve this problem, mobile phones with an earphone jack have been provided to allow a phone call with the mobile phone via an earphone. However, a problem with such an earphone is the inconvenience that it must be inserted in an ear of the user for use.

A further development in this direction is a handsfree device connectable to a mobile phone, allowing a user to communicate with the mobile phone neither using an earphone, nor holding the mobile phone with his hand.

A handsfree device is generally connected to a connector of a mobile phone for use. Here, when receiving voice, the digital voice signal is received through the connector, and then, converted into analog voice signal by a built-in codec (coder and decoder), to be subsequently outputted as voice signal through a speaker. On the other hand, when transmitting voice, the analog voice signal inputted via a microphone is converted into digital signal by the codec, to be subsequently transmitted to the mobile phone via ICC.

Accordingly, to enable a phone communication with a mobile phone connected with a handsfree device, a digital voice signal terminal as well as a terminal for recognition of the handsfree device are required, in addition to a codec installed in the handsfree device for processing the digital voice signals. Further, the handsfree device needs to be powered by the vehicle, and, if such power supply from the vehicle is not available, an external power supply of 12V DC is required.

Consequently, such a handsfree device is disadvantageous in that it is of high price and its installation in a vehicle is troublesome.

SUMMARY OF THE INVENTION

The present invention, conceived to solve the aforementioned problems, aims to provide a speaker module, which is of low price and can easily be installed, as an auxiliary device and a method for using same.

Another objective of the present invention is to provide an easily installable handsfree device for mobile phones.

In order to achieve the above objectives, the present invention provides a speaker module directly connectable to an earphone jack of a mobile phone, comprising a microphone capable of converting voice signals into electrical signals, a speaker capable of converting electrical signals into voice signals, an amplifier capable of amplifying electrical signals, and a plug for connecting with an earphone jack terminal of the mobile phone. The plug may also comprise a terminal for sensing whether a speaker module is connected to an earphone jack terminal of the mobile phone.

DETAILED DESCRIPTION

Figure 1:
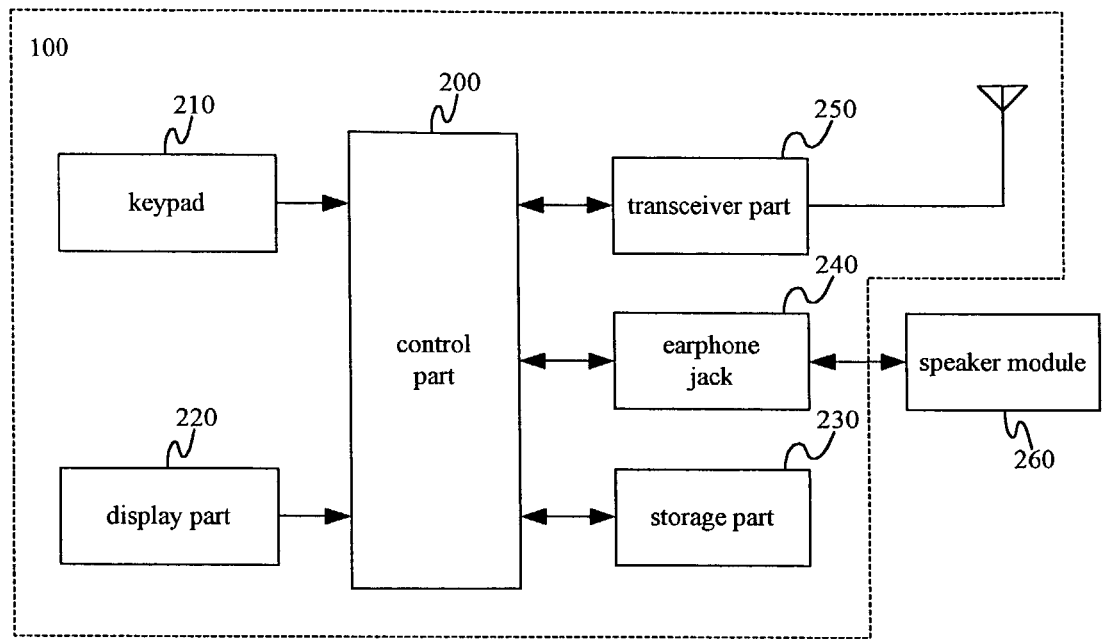
FIG. 1 is an illustrative block diagram showing the internal construction of a speaker module in accordance with an embodiment of the present invention as connected to a mobile phone.

A detailed description of an illustrative embodiment of the present invention is given below making reference to the accompanying drawings FIG. 1 is a block diagram showing the internal construction of a mobile phone connected to a speaker module in accordance with the present invention.

The mobile phone 100 includes a control part 200, a keypad 210, a display part 220, a storage part 230, an earphone jack 240, and a transceiver part 250.

Earphone jack 240 is connected to a detachable speaker module 260 of the present invention. Operation of the mobile phone with the above construction is described below.

Control part 200, being a part for the functional controlling of the mobile phone, and which includes e.g., a microprocessor controls in particular the processes of the present invention, and controls signals for phone calls with the speaker module installed in the mobile phone in addition to its other operations for general mobile phone communications. Further, the control part also controls the power supply for the speaker module and participates in sensing whether the speaker module is detached or attached.

Keypad 210 equipped with functional key buttons (e.g., dial buttons) may be used as a user interface when the user, for example, selects start/end of a call, or dials a telephone number.

Display part 220 may display the status information of the mobile phone with the control from control part 200. The status information may be telephone numbers dialed by the user, telephone numbers of the callers, and/or a message notifying arriving phone calls.

Storage part 230 stores messages processed by control part 200. The processed messages may include information data such as telephone numbers, predetermined programs for users' convenience and for embodying various basic functions.

Earphone jack 240 is a terminal for connecting the mobile phone with an earphone. When an earphone is connected to the earphone jack of the mobile phone, control part 200 establishes a communication path to the earphone jack thereby enabling a telephone call via the connected earphone.

In the illustrative embodiment of the present invention, speaker module 260 is connected to the mobile phone via the earphone jack. Also in case of a telephone call using the speaker module, control part 200 establishes a communication path to earphone jack 240 thereby enabling a telephone call via the earphone jack similar to the case of a telephone call using the earphone.

Figure 2:
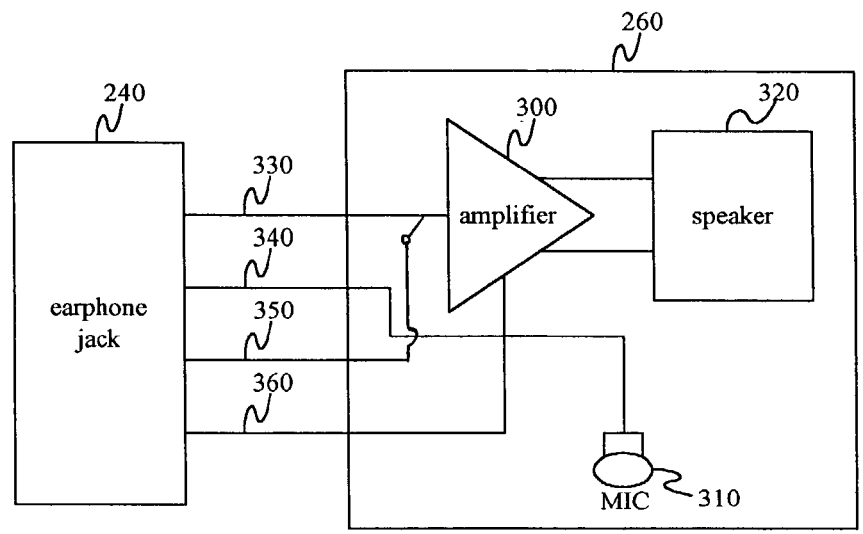
FIG. 2 is a block diagram illustrating in detail how the speaker module in FIG. 1 is connected to an earphone jack connecting part of a mobile phone.

FIG. 2 is a block diagram illustrating how speaker module 260 in FIG. 1 is connected to earphone jack 240 of the mobile phone as discussed in detail below.

Earphone jack 240 comprises four terminals 330, 340, 350, 360: one for transmission of power to the speaker module 260, one for transmission of voice signals from a communication partner, one for sensing whether or not the speaker module has been attached, and one for receiving voice signals from the speaker module.

Transceiver part 250 (FIG. 1) transmits/receives telephone communication and control signals from the base stations via an antenna.

Speaker module 260 connected to the mobile phone via earphone jack 240 outputs voice signals of a communication partner or receives voice signals of a user of the mobile phone. Construction of such speakerphone module is described in detail below referring to FIG. 2.

Figure 4:
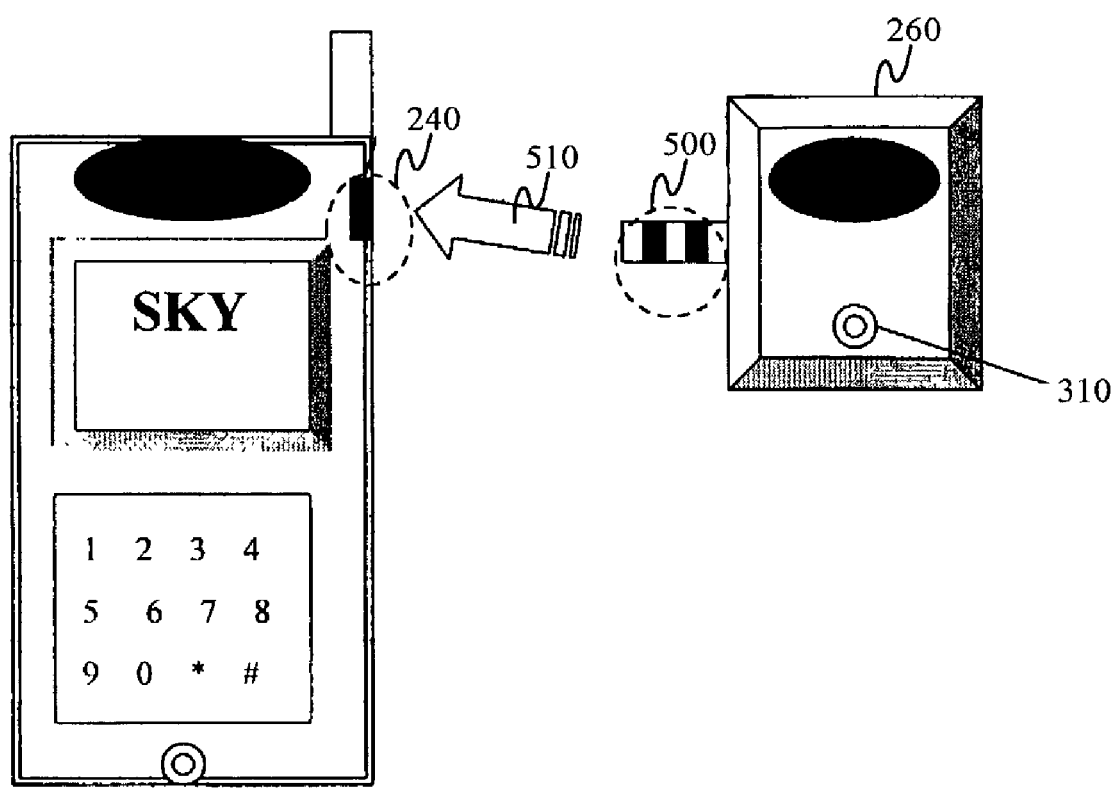
FIG. 4 is a drawing showing how the speaker module is connected to a mobile phone in accordance with an illustrative embodiment of the present invention.

Earphone jack 240 includes a first terminal (EARJ) 330 for transmission of voice signals from a communication partner, a second terminal (MICJ) 340 for transmission of voice signals generated by the microphone installed in speaker module 260 to the mobile phone, a third terminal (Jack_Sense) 350 for sensing whether or not the speaker module is installed, and a fourth terminal 360 for supplying power to the speaker module 260. Among these terminals, the third terminal (i.e. Jack_Sense terminal) which is internally pulled-up and contacts physically with the first terminal EARJ 330, may be separated from the first terminal. In other words, when plug 500 of the speaker module is inserted into the earphone jack of mobile phone as shown in FIG. 4, the contact between the third Jack_Sense terminal 350 and the first EARJ terminal 330 is disconnected. Since such earphone jack 240 has the same construction as an earphone jack of a conventional mobile phone, a further explanation thereof is omitted.

As plug 500 of speaker module 260 is inserted as shown in FIG. 4, the Jack_Sense terminal is disconnected from the EARJ terminal, and this process effects the Jack_Sense terminal to be switched over from High to Low. Accordingly, the control part can recognize, by sensing the Jack_Sense terminal, whether or not the speaker module 260 is connected to the mobile phone. Furthermore, the Jack_Sense terminal additionally functions as a ground terminal for power supply to speaker module 260 as well as a resistance terminal for voice communication signals.

Again with reference to FIG. 2, speaker module 260 includes an amplifier 300 for amplification of voice signals, a speaker 320 for outputting of voice signals received from the mobile phone, and a microphone 310 for generating voice signals after having received a user's voice.

Amplifier 300 amplifies the signals to be outputted by the mobile phone after having received the same from the EARJ terminal (i.e., first terminal 330), and then, transmits the amplified signals to the speaker part. The amplified power is normally 0.5 to 0.7 watts. Further, the amplifier is supplied with power from power source of the mobile phone via the fourth terminal 360.

Speaker 320 outputs the electrical voice signals as amplified by amplifier 300 after having converted the same into acoustic voice signals.

Microphone 310 converts the acoustic voice signals generated by a mobile phone user into electrical signals, which are subsequently transmitted to the control part of the mobile phone via the MICJ terminal (i.e., second terminal 340). The transmitted signals are converted into PCM data after having been amplified and filtered by the codec of the control part. The converted PCM data is then transmitted wirelessly via transceiver part 250 of the mobile phone after having been converted into compressed voice signals by a vocoder (voice encoder) of the control part for a radio transmission.

Although not illustrated in the drawings, speaker module 260 may additionally comprise conventional speakerphone circuits for usual speakerphone function. If such speakerphone circuits are added, a half-duplex type speakerphone communication is enabled by opening a one-way path after comparison of the signals from microphone 310 and the signals from speaker 320.

Figure 3:
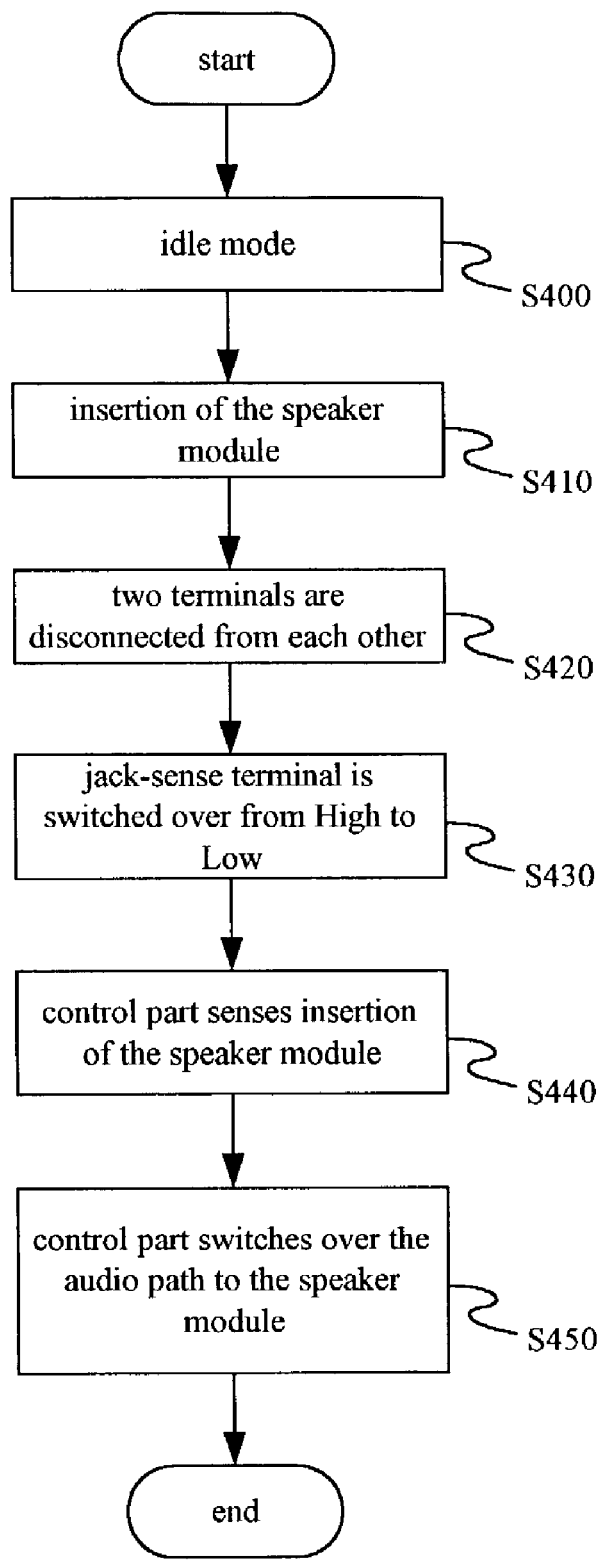
FIG. 3 is a flow chart illustrating the recognition process of the speaker module as inserted into a mobile phone in accordance with the present invention.

FIG. 3 is a flow chart illustrating the recognition process of speaker module 260 as the speaker module is inserted into the mobile phone.

The mobile phone maintains idle mode (step S400) in the absence of a key button operation by a user. In this mode, a user inserts the plug of the speaker module into the jack of the mobile phone as illustrated in FIG. 4, in order to install the speaker module to the mobile phone (step S410).

Subsequently, the third Jack_Sense terminal in the mobile phone jack is disconnected from the first EARJ terminal (step S420), whereupon the Jack_Sense terminal is switched from a logical High to logical Low (step S430).

As a result, the control part of the mobile phone senses, as the Jack_Sense terminal is switched from a logical High to logical Low, that the speaker module is connected to the mobile phone (step S440), and connects the audiopath from the receiver of the mobile phone to the EARJ terminal of the speaker module (step S450).

As the mobile phone and the speaker module are fully connected through the jack and plug, a caller's voice can be outputted through the speaker of the speaker module. In addition, the mobile phone user can also transmit his voice to a communication partner through microphone of the speaker module.

As described above, the present invention provides an inexpensive and easily installable speaker module by connecting the same to an earphone jack of a mobile phone. Further, the present invention provides an easily installable handsfree device for a mobile phone by including speakerphone circuits in the speaker module.

As described above, the present invention provides an inexpensive and easily installable speaker module by connecting the same to an earphone jack of a mobile phone. Further, the present invention provides an easily installable handsfree device for a mobile phone by including speakerphone circuits in the speaker module.

Although the present invention has been described above with reference to an illustrative embodiment, it should be noted that the present invention is not limited thereto, but rather, the scope of the present invention shall be determined by the appended claims, allowing various adaptations, modifications, and alterations without departing the scope and spirit of the present invention as those skilled in the art will understand.

What is claimed is:

1. A speaker module comprising:
   an amplifier which amplifies voice signals transmitted from a mobile phone;
   a speaker which converts electrical signals from said amplifier into acoustic signals;
   a microphone which converts voice signals into electric signals; and
   a plug for connecting with the earphone jack of the mobile phone, wherein said plug includes a first terminal for transmission of voice signals from said mobile phone to said amplifier, a second terminal for transmission of voice signals from said microphone to said mobile phone, a third terminal for sensing whether a speaker module is installed and functions as a ground, and a fourth terminal for supplying power to said speaker module.

2. The speaker module as set forth in claim 1, in communication with a mobile phone which comprises additional circuits thereby enabling a speakerphone communication.

3. A method for communication using the speaker module of claim 1, the method comprising the steps of:

disconnecting said first terminal of the plug from said third terminal of the plug as the plug of the speaker module is inserted into the earphone jack of the mobile phone;

switching the logical level of said third terminal from High to Low; sensing by the control part of the mobile phone that the speaker module is connected to the mobile phone;

connecting an audio path from a receiver of the mobile phone to said first terminal of the speaker module; and supplying power to the speaker module from the mobile phone.

4. A method for communication with a mobile phone using a speaker module equipped with a plug adapted to be connected to the mobile phone via an earphone jack of the mobile phone, wherein the plug includes a first terminal for transmission of voice signals from said mobile phone to said amplifier, a second terminal for transmission of voice signals from said microphone to said mobile phone, a third terminal for sensing whether a speaker module is installed and functions as a ground, and a fourth terminal for supplying power to said speaker module, the method comprising the steps of:

inserting the plug of the speaker module into the earphone jack of the mobile phone;

disconnecting said first terminal of the plug from said third terminal of the plug;

switching logical level of said third terminal of the plug from High to Low;

connecting an audio path from a receiver of the mobile phone to said first terminal of the speaker module; and supplying power to the speaker module from the mobile phone.

* * * * *